United States Patent
Plastina et al.

(10) Patent No.: US 7,392,477 B2
(45) Date of Patent: Jun. 24, 2008

(54) RESOLVING METADATA MATCHED TO MEDIA CONTENT

(75) Inventors: Daniel Plastina, Sammamish, WA (US); John Wesley Terrell, Bothell, WA (US); Christopher K. Brownell, Carnation, WA (US); Michael Novak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 10/623,471

(22) Filed: Jul. 18, 2003

(65) Prior Publication Data

US 2005/0015712 A1 Jan. 20, 2005

(51) Int. Cl.
 *G06F 15/00* (2006.01)
 *G06F 17/00* (2006.01)
(52) U.S. Cl. ........................... 715/500; 715/764
(58) Field of Classification Search ............... 715/500.1, 715/501.1, 511, 512, 530, 500, 516
 See application file for complete search history.

(56) References Cited

U.S. PATENT DOCUMENTS

| | | | |
|---|---|---|---|
| 5,761,677 A * | 6/1998 | Senator et al. ............. 707/203 | |
| 5,793,980 A | 8/1998 | Glaser et al. | |
| 6,230,207 B1 | 5/2001 | Roberts et al. | |
| 6,407,753 B1 * | 6/2002 | Budinsky et al. ............ 715/764 | |
| 6,418,421 B1 * | 7/2002 | Hurtado et al. ............... 705/54 | |
| 6,449,627 B1 | 9/2002 | Baer et al. | |
| 6,452,609 B1 | 9/2002 | Katinsky et al. | |
| 6,463,445 B1 * | 10/2002 | Suzuki et al. ............... 707/200 | |
| 6,549,922 B1 * | 4/2003 | Srivastava et al. .......... 707/205 | |
| 6,560,607 B1 | 5/2003 | Lassesen | |
| 6,587,837 B1 | 7/2003 | Spagna et al. | |
| 6,760,721 B1 | 7/2004 | Chasen et al. | |
| 6,973,451 B2 | 12/2005 | Laronne et al. | |
| 2001/0031066 A1 * | 10/2001 | Meyer et al. ................ 382/100 | |
| 2002/0001395 A1 * | 1/2002 | Davis et al. ................. 382/100 | |
| 2002/0033844 A1 * | 3/2002 | Levy et al. .................. 345/744 | |
| 2002/0059370 A1 | 5/2002 | Shuster | |
| 2002/0069218 A1 * | 6/2002 | Sull et al. ................ 707/501.1 | |
| 2002/0099694 A1 | 7/2002 | Diamond et al. | |
| 2002/0099737 A1 * | 7/2002 | Porter et al. ................ 707/513 | |
| 2002/0103920 A1 * | 8/2002 | Berkun et al. .............. 709/231 | |
| 2002/0143976 A1 * | 10/2002 | Barker et al. ............... 709/231 | |
| 2002/0157095 A1 * | 10/2002 | Masumitsu et al. .......... 725/46 | |

(Continued)

OTHER PUBLICATIONS

Swierk et al., "The Roma Personal Metadata Service", Mobile Networks and Applications, vol. 7, issue 5, Oct. 2002, pp. 407-418.*

(Continued)

*Primary Examiner*—William Bashore
*Assistant Examiner*—James J Debrow
(74) *Attorney, Agent, or Firm*—Senniger Powers LLP

(57) ABSTRACT

Managing a plurality of states of metadata. Each of the states stores one or more items of metadata that have been automatically matched and obtained for media content (e.g., for rendering by a media player). The invention resolves the matched metadata by selectively applying some or all of the matched metadata items without user intervention (e.g., based on a user-specified threshold). In one embodiment, the invention selectively applies some or all of the matched metadata items based on a trustworthiness rating associated with the metadata match. The invention displays the remaining metadata items to the user for review and acceptance or rejection.

41 Claims, 5 Drawing Sheets

U.S. PATENT DOCUMENTS

| | | |
|---|---|---|
| 2002/0184180 A1 | 12/2002 | Debique et al. |
| 2002/0194480 A1 | 12/2002 | Nagao |
| 2003/0028798 A1 | 2/2003 | Roberts et al. |
| 2003/0036948 A1 | 2/2003 | Woodward et al. |
| 2003/0084460 A1 | 5/2003 | Chung et al. |
| 2003/0225777 A1* | 12/2003 | Marsh ........................ 707/101 |
| 2004/0006575 A1* | 1/2004 | Visharam et al. ......... 707/104.1 |
| 2004/0064500 A1* | 4/2004 | Kolar et al. ................. 709/202 |
| 2004/0172593 A1* | 9/2004 | Wong et al. ................. 715/512 |
| 2004/0175159 A1 | 9/2004 | Oetzel et al. |
| 2004/0215718 A1 | 10/2004 | Kazmi et al. |
| 2004/0267693 A1* | 12/2004 | Lowe et al. ..................... 707/1 |
| 2005/0021500 A1 | 1/2005 | Plastina et al. |
| 2005/0234958 A1* | 10/2005 | Sipusic et al. ............... 707/102 |
| 2006/0136572 A1* | 6/2006 | Stern et al. .................. 709/217 |

OTHER PUBLICATIONS

Chen et al.; "Metadata for Mixed-Media Access"; 1994; SIGMOD Record, vol. 23, No. 4; pp. 64-70.*

Ganger et al.;"Soft Updates: A Solution to the Metadata Update Problem in File Systems";2000;ACM;pp. 127-153.*

Bohm et al.,"Metadata for Multimedia Documents", SIGMOD Record, vol. 23, No. 4, Dec. 1994, pp. 21-26.*

Paepcke et al., "Beyond Document Similarity: Understanding Value-Based Search and browsing Technologies", SIGMOD, 2000, pp. 80-92.*

Minibayeva et al., "A Digital Library Data Model for Music," Proceedings of the Second ACM/IEEE-CS Joint Conference on Digital Libraries, 2002, pp. 154-155, ACM Press, New York, U.S.A.

MusicMatch, MusicMatch Jukebox User's Guide, Feb. 7, 2003, Chapters A1-A6 & 1-9.

* cited by examiner

RESOLVING METADATA MATCHED TO MEDIA CONTENT

TECHNICAL FIELD

Embodiments of the present invention relate to the field of metadata for media content. In particular, embodiments of this invention relate to accepting or rejecting metadata matched to media content.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files such as Moving Picture Experts Group audio layer-3 (MP3) files and WINDOWS MEDIA technologies audio (WMA) and video files. The computer typically organizes the media files into playlists when the compressed media files are played on the computer. The files may be organized according to metadata or other property data associated with the media content. Metadata for a digital media file such as an audio file includes general information pertaining to the media file itself. This information is typically stored within the file. For example, an audio file may have metadata tags for the song title, song artist, album title, and a rating. For example, in the case of audio media files, the files may be organized by album, artist, genre, date, or some user-specified selection and ordering. A user easily navigates through this organization using menus and graphical displays to render the desired media files.

However, some media files lack metadata or have metadata that needs to be updated. The organization of such media files without sufficient metadata is limited. Some existing systems request metadata for audio content. However, these existing systems fail to obtain metadata for media content in a way that is compelling to users while not being overly intrusive. There is a need for a metadata service that automatically, without user intervention and in the background, updates all of the media content of the user as specified by the user regardless of the quality of the metadata currently in the file storing the media content. Existing systems further fail to provide the user with the same metadata experience when inserting any computer-readable medium storing content. The quality of the metadata is important because selecting music can be the bulk of the work in listening to music (e.g., users often listen to the radio because someone else has taken on the burden of selecting the music), particularly when users have access to large music collections (e.g., digital formats, P2P, etc.).

Accordingly, a system for resolving metadata matched to media content is desired to address one or more of these and other disadvantages.

SUMMARY OF THE INVENTION

Embodiments of the invention include managing a plurality of states of metadata. Each of the states includes one or more items of metadata that have been automatically matched and obtained for media content (e.g., for rendering by a media player). The invention resolves the matched metadata by selectively applying some or all of the matched metadata items without user intervention (e.g., based on a user-specified threshold). For example, the invention selectively applies some or all of the matched metadata based on a trustworthiness rating associated with the metadata match. The invention replaces each item of metadata associated with one state with a corresponding item of the obtained metadata associated with another state. The replaced metadata items are stored in a history data structure for future use. For example, a user may request to "undo" a change to metadata for an item of media content and return to a previously stored state. The invention displays the unapplied metadata items to the user for review and acceptance or rejection. The invention enables the user to accept the displayed metadata items or search for alternative metadata for the media content. The invention improves the metadata experience for the user.

In accordance with one aspect of the invention, a method processes data in a media player. The method includes generating a request for metadata from a metadata provider. The requested metadata is associated with media content adapted for rendering by the media player. The method also includes receiving return metadata from the metadata provider in response to the request for metadata and receiving a trustworthiness rating corresponding to the return metadata.

In accordance with another aspect of the invention, a method manages a plurality of metadata states. Each metadata state includes one or more items of metadata associated with media content rendered by a media player. The method includes receiving a request from a user to replace one metadata state with another metadata state. The method also includes replacing each set of metadata items associated with the one metadata state with a corresponding set of metadata items associated with the other metadata state in response to the received request.

In accordance with still another aspect of the invention, a system includes one or more computer-readable media that have computer-executable components for managing one or more items of metadata associated with media content rendered by a media player. The components include a communications component for receiving metadata associated with the media content. The communications component further receives a trustworthiness rating associated with the received metadata. The system also includes an authoring module for selectively applying the received metadata to the media content based on a trustworthiness rating received via the communications component.

In accordance with yet another aspect of the invention, a method updates metadata in a computer system having a user interface including a display and being responsive to a user interface selection device. The method includes receiving metadata that corresponds to media content from a metadata provider and displaying the received metadata to the user on the display. The method also includes receiving a selection request from the user via the user interface selection device. The selection request specifies acceptance or rejection of the displayed metadata. The method also includes performing an action on the displayed metadata in response to the received selection request.

In accordance with another aspect of the invention, a user interface enables a user to select one of a plurality of values associated with a metadata item. The metadata item is associated with media content. The user interface includes one or more data fields. Each data field displays a metadata value associated with the metadata item. The user interface also includes a selection field for receiving a command from a user. The command selects one or more of the metadata values from the data fields for association with the metadata item and storage with the media content. The user interface also includes a query field for receiving a search term from the user. The search term describes the media content and enables determination of another metadata value relevant to the media item based on the received search term.

In accordance with still another aspect of the invention, a computer-readable medium stores a data structure representing a media content file. The data structure includes a data field storing media content for rendering by a media player. The data structure also includes a history field that stores a plurality of metadata states for the media content. Each metadata state includes one or more items of metadata associated with the media content.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

In an embodiment, the invention includes processing metadata received from a metadata provider for an item of media content. The invention includes resolving the metadata by determining whether the received metadata should be associated with the item of media content. The invention prompts a user to accept or reject the received metadata. Alternatively or in addition, the invention determines whether to prompt the user based on a trustworthiness rating received from the metadata provider and associated with the media content. The trustworthiness rating represents a quality metric describing the confidence placed in matching the metadata to the media content. An item of metadata for media content includes an identifier (e.g., "Song Title") and/or a value (e.g., "Song A") specific to the media content. For example, the items of metadata may be delineated by an identifier or the items may simply comprise a series of values concatenated in a specific order.

Media Environment

Figure 1:
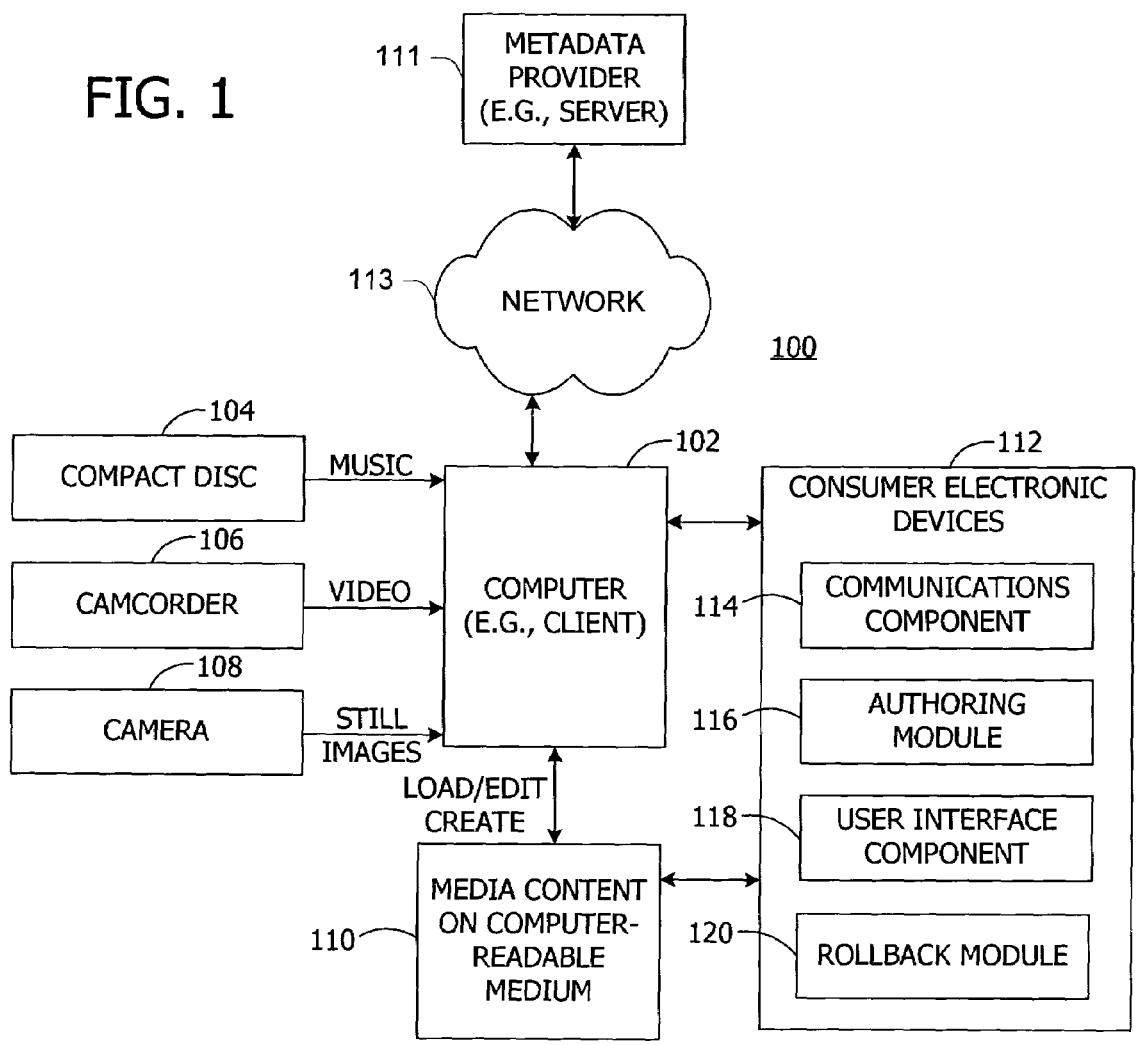
FIG. 1 is a block diagram illustrating one example of a suitable media environment in which the invention may be implemented.

Referring now to the drawings, FIG. 1 illustrates an exemplary multimedia environment in which the invention may be used. A system 100 has one or more computers 102 coupled to one or more devices providing media content including audio data, video data, and/or image data. For example, the devices may include a compact disc (CD) 104, a camcorder 106, or a camera 108. The computer 102 accesses the media content as input and can render or store the media content as a digital media file to a computer-readable medium 110.

In one embodiment, the computer 102 stores media content on a computer-readable medium 110 for use by a media player program associated with a consumer electronic device 112. The consumer electronic device 112 includes any suitable rendering filter or media player or device that is configured to render digital media so that the user can experience the content that is embodied on the medium 110. For example, suitable media player applications include a CD media player and a DVD media player.

Media players, consumer electronic devices 112, or the like may be organized according to the capabilities of the media player. Each media player has a media type that identifies the type of media that the media player is capable of rendering. For example, the media type (also referred to as a playlist summary type, a menu summary type, or the like) includes one or more of the following: audio, video, and still image. Some media players include audio-only players such as portable CD players, car receivers, and DVD players. Other media players further include audio and still image capable players including portable and set-top DVD players optionally capable of rendering images with audio simultaneously. Other media players further include audio, still image, and video capable players. Exemplary consumer electronic devices 112 include, but are not limited to, the following: a portable CD player, a Moving Picture Experts Group audio layer-3 (MP3) player, an audio system in an automobile, a personal digital assistant, a cellular telephone, or the like.

One aspect of the present invention enables the user or, particularly, enables a media player program executing on computing device 112 or client, to access, retrieve, and display for the user, so-called metadata. Those skilled in the art are familiar with metadata, which is simply information about data. In the context of the present invention, metadata includes information related to specific content of a digital media file being played on the media player. Basic metadata includes a title, composer, performer, genre, a description of content, and the like. Extended metadata includes cover art, performer biographies, reviews, related performers, where to buy similar items, upcoming concerts, ticket sales, URLs to other related experiences including purchase opportunities, and the like.

The user of consumer electronic device 112 inserts a computer-readable medium storing a digital media file into computer 102, or otherwise causes the content of the digital media file to be experienced. In the embodiment of FIG. 1, metadata provider 111 matches metadata to the specific media content that is being experienced by the user. Metadata provider 111 then returns the metadata to computer 102.

In the examples herein, the media content of the digital media file is described in the context of content embodied on a CD or a DVD. It is to be appreciated and understood that the media content may be embodied on any suitable media, including digital files downloaded to memory accessible by computer 102, and that the specific examples described herein are given to further understanding of the inventive principles. For convenience, a digital media file refers to one or more files representing, for example, a single song track or a collection of tracks such as would be found on an audio CD.

The media content may include, without limitation, specially encoded media content in the form of an encoded media file.

In one embodiment, an exemplary consumer electronic device 112 or media player includes or has access to one or more computer-readable media having computer-executable components for reconciling metadata automatically matched to media content. The media content is stored in a file on a computer-readable medium. In one example, the metadata is available from a metadata provider 111 via a data communication network 113. The computer 102 and metadata provider 111 are coupled to the data communication network 113. While the network 113 includes the Internet in one example, the teachings of the invention may be applied to any data communication network. Further, the invention may be described in terms of computer 102 acting as a client (e.g., media player software) requesting and receiving metadata from metadata provider 111 acting as a server as shown in FIG. 1. However, it is contemplated by the inventors that the invention is operable in other network systems. That is, the invention is not limited to a client/server network system illustrated in FIG. 1. For example, the invention may be applicable in a peer-to-peer network system.

In the embodiment illustrated in FIG. 1, the components are shown to execute on consumer device 112 for simplicity. It is to be understood that any of the components may execute on the consumer device 112, computer 102, or any other computing device (e.g., remote from the user or device 112) or combination thereof. The components are further described below with reference to FIG. 2 and FIG. 4. The components include a communications component 114, an authoring module 116, a user interface component 118, and a rollback module 120. As described in greater detail herein, the communications component 114 receives metadata associated with the media content from the metadata provider 111. The communications component 114 further receives a trustworthiness rating associated with the received metadata from the metadata provider 111. As described above, the communications component 114 may execute on computer 102 to communicate with metadata provider 111 via the network 113. As metadata automatically matched to media content is received by the communications component 114, the authoring module 116 selectively applies the received metadata to the media content based on the received trustworthiness rating. The user interface component 118 displays, to the user for review based on the received trustworthiness rating, the items of metadata received via the communications component 114. The rollback module 120 maintains a history data structure in the file storing the received metadata.

Those skilled in the art will note that the invention software may be implemented with any number and organization of components or modules. That is, the invention is not limited to the specific configuration of components 114, 116, 118, and 120. Further, those skilled in the art will note that the invention may include a user interface such as the media player executing on consumer electronic device 112 or may lack a user interface (e.g., perform metadata resolution silently in the background independent of a media player).

Metadata Reconciliation

Figure 2:
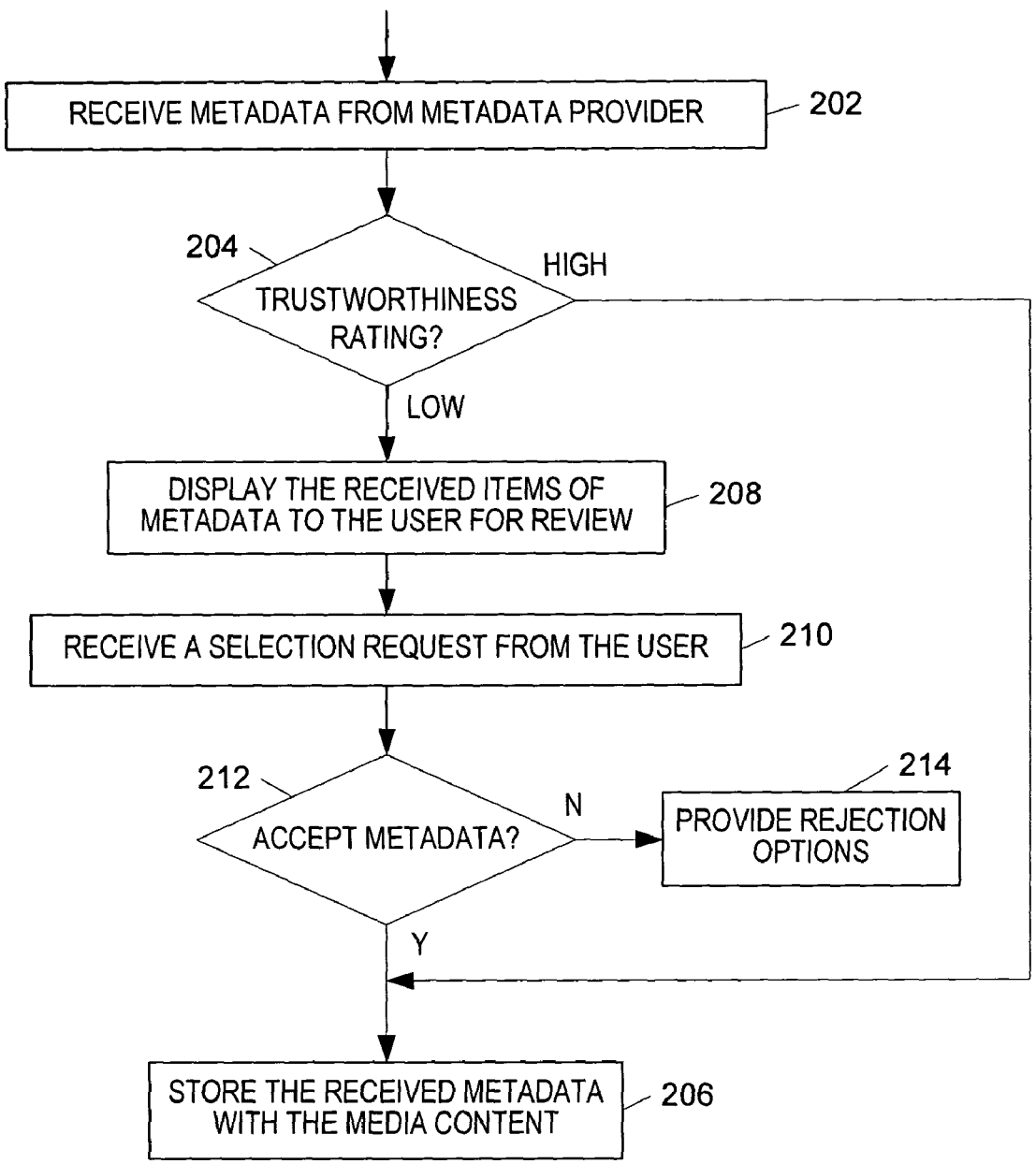
FIG. 2 is an exemplary flow chart illustrating a reconciliation protocol for resolving metadata according to the invention.

Referring next to FIG. 2, an exemplary flow chart illustrates a reconciliation protocol for resolving metadata according to the invention. The invention software (e.g., executing in a media player) requests metadata for media content from a metadata provider. A metadata provider includes any source that provides metadata or other property data including, but not limited to, a human operator, a local cache, a media library, or a remote server. Metadata includes, but is not limited to, at least one of the following: an album title, an artist name, a song title, a genre, a composer name, a track number, a studio, a director, and a rating. In one embodiment, the requests are generated automatically by a media player attempting to obtain metadata silently in the background (e.g., without explicit user acceptance or validation). In another embodiment, the metadata is continuously delivered via a metadata broadcast channel (e.g., using push technology) such that the invention software has access (e.g., locally) to updated metadata for all media content.

In one example, when performing automatic metadata fetching on a large number of tracks of a compact disc, the invention processes the tracks in a specific order to raise the perceived speed at which the metadata is being updated. The order favors tracks having identifiers (e.g., WMContentID or a table of contents value) over those tracks lacking identifiers. That is, the media player generates metadata requests for tracks having identifiers, then generates requests for the remaining tracks as the requests lacking identifiers result in slower, more server intensive metadata matching (e.g., via "fuzzy" matching algorithms). In addition, foreground operations take precedence over the background processing to further improve the perceived speed of the metadata update process. For example, when a user inserts a CD or DVD, plays a song, or views a given folder in the library while the background queue is filled with work, the metadata is requested with high priority.

The metadata provider identifies metadata matched to the media content, determines the identified metadata to be relevant to the media content, and sends the matched metadata to the invention software. The invention software receives the matched metadata from the metadata provider at 202. In response to the received metadata, the invention software reconciles the received metadata by performing various actions based on a trustworthiness rating or other confidence rating associated with the received metadata. The various actions include updating the media files, renaming the files, and organizing directory structures. For example, if the trustworthiness rating indicates a high degree of confidence with the metadata match at 204, the received metadata is automatically applied (e.g., stored with) the media content at 206 without user intervention.

The invention applies the metadata in part by managing a plurality of states of metadata via a history data structure. The history data structure stores at least one metadata state for the item of media content (e.g., in the file storing the media content). Each of the metadata states includes one or more items of metadata associated with the item of media content. The invention software retrieves previous states of metadata as needed. For example, if the received trustworthiness rating indicates a low degree of confidence with the metadata match at 204, the user is prompted to review and accept or reject the received metadata. The invention software displays the received items of metadata to the user for review at 208 and prompts the user to review and/or accept the received metadata. In another embodiment, the invention software displays metadata items to the user for review in response to a request from the user to edit the metadata associated with a particular item of media content.

The invention software receives a selection request from the user at 210. If the user indicates acceptance of the received metadata via the selection request at 212, the invention software updates the history data structure and stores the received metadata with the media content at 206. If the user indicates rejection of the received metadata at 212, the invention software provides other options to the user at 214 that are described with reference to FIG. 3 below. For example, the user may request that the invention software replace the received metadata with previously received metadata stored in the history data structure. That is, the invention software replaces each item of metadata associated with one metadata state with a corresponding item of metadata from another metadata state stored in the history data structure. If the suggested metadata had already been stored with the media content, the invention software performs a "roll back" or otherwise removes the match resulting from the automated metadata operation.

Figure 6:
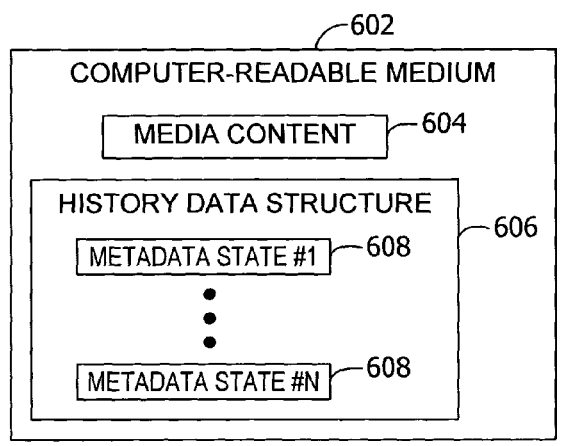
FIG. 6 is a block diagram illustrating an exemplary computer-readable medium storing a media content file according to the invention.

For example, the song "SongA.MP3" is matched to metadata including the song title "Song A" and the artist name "Artist A." At a later time, the user changes the song title to "Song A—Live in St. Louis" by matching it to another compact disc. The user then determines that the subsequent song title update was incorrect. With the invention software, the user may "undo" the most recent change and restore the previous song title without a full "roll back" to a state of the media content lacking any metadata. It is contemplated by the inventors that the metadata states may be stored in any number of data structures including a single history data structure as illustrated in FIG. 6.

The invention maintains a metadata tag such as "WMRollbackMetadata" in the history data structure stored in the media file. When replacing an existing metadata state with an updated metadata state, the invention software stores the existing metadata state in the history data structure with the WMRollbackMetadata tag to enable future access (e.g., a future "undo" operation) to the replaced metadata state. If the WMRollbackMetadata tag does not exist, the invention software creates the tag and populates the history data structure with the existing metadata state. In one embodiment, the WMRollbackMetadata tag stores any number of previous metadata states and/or the current metadata state. At any point in time (e.g., not dependent on a database), the user may "undo" any or all changes made to the current metadata state by accessing the data stored by the WMRollbackMetadata tag.

Those skilled in the art will note that the WMRollbackMetadata tag may be implemented in any number of ways, some of which are known in the art. In one embodiment, the invention stores the WMRollbackMetadata tag data along with other tag data in binary form in a persisted property data structure.

One or more computer-readable media have computer-executable instructions for performing the method illustrated in FIG. 2.

Figure 3:
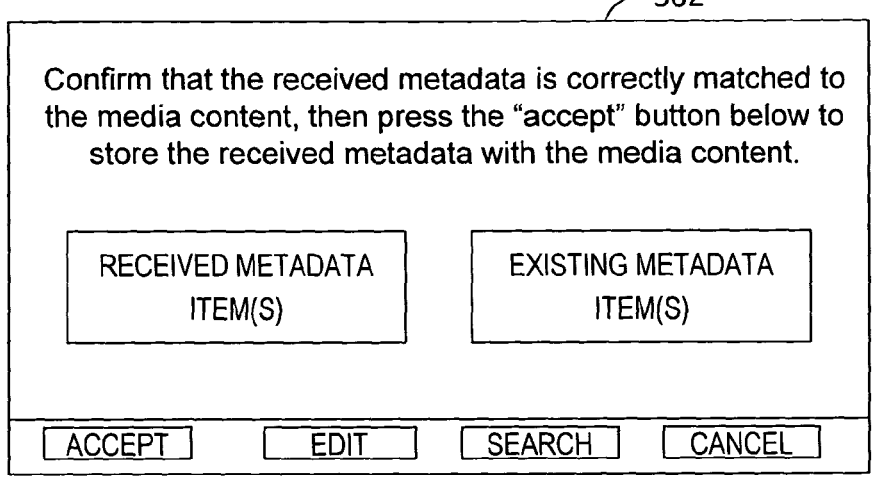
FIG. 3 is an exemplary block diagram illustrating a user interface for selecting metadata for association with media content.

Referring next to FIG. 3, an exemplary block diagram illustrates a user interface 302 for selecting metadata for association with media content. The user interface 302 displays existing metadata and updated metadata for the user to accept, reject, or edit the displayed metadata. In an embodiment in which user intervention is desired, the invention updates metadata in a computer system having the user interface 302 including a display and being responsive to a user interface selection device. The user interface 302 may also include a display device. The invention software receives metadata corresponding to media content from the metadata provider and displays the received metadata to the user on the display in the user interface 302. The invention software further receives a selection request from the user via the user interface selection device specifying acceptance or rejection of the displayed metadata. For example, the user selects an "accept" button to accept or approve the displayed metadata for storage and association with a particular item of media content. Rejection of the received metadata includes, but is not limited to, a request from the user to reject the displayed metadata, search for alternative metadata, edit some or all of the received metadata, restore previously received metadata, and/or cancel the metadata operation. For example, the user selects an "edit" button in the user interface to manually enter track, album, artist, and genre information about a specific track. Further, the user selects a "search" button in the user interface to refine the search for metadata and submit the refined search to obtain other metadata.

The invention software performs an action on the received metadata in response to the received selection request. Performing the action includes, but is not limited to, storing the received metadata with the media content, storing the received metadata in a cache, and discarding the received metadata. In particular, the user interface 302 enables the user to select one of a plurality of values associated with a metadata item. The user interface 302 includes one or more data fields. Each of the data fields displays a metadata value associated with the metadata item. The user interface 302 also includes a selection field. The selection field receives a command from the user. The command selects one or more of the metadata values from the data fields for association with the metadata item and storage with the media content. The selection field includes a plurality of checkboxes each associated with one of the data fields, a button which indicates acceptance of the selected metadata value, or any other user interface element for indicating the command. For example, the selection field receives a command from the user to edit the displayed metadata values. The user interface 302 further includes a rating field displaying a trustworthiness rating associated with the metadata value for each of the data fields. The user interface 302 also includes a query field for receiving a search term from the user. The search term describes the media content and enables determination of another metadata value relevant to the media item based on the received search term. For example, the search term may include an artist name or album title or a portion thereof. The invention software sends the search term to the metadata provider. The metadata provider searches for additional metadata values based on the search term, and delivers the additional metadata values to the invention software for display in user interface 302.

In one embodiment, the invention displays "before" and "after" metadata to the user in the user interface 302. The user selects "ok" to revert to the "before" metadata if an error is detected in the "after" metadata. The "before" metadata is stored in the media content file itself. In this manner, the undo or revert operation may be performed subsequently (e.g., on a different computer) as the "before" metadata is encapsulated with the file storing the media content. Alternatively, or in addition, the user interface provides an "edit" element enabling the user to accept some of the metadata items and to edit or reject other metadata items. Further, the invention generates a popup window or other window element for receiving edits to the metadata from the user. Those skilled in the art will note that the user interface 302 in FIG. 3 is exemplary. It is contemplated by the inventors that the user interface 302 of the invention may display a plurality of metadata states for selection by the user (not shown).

Figure 4:
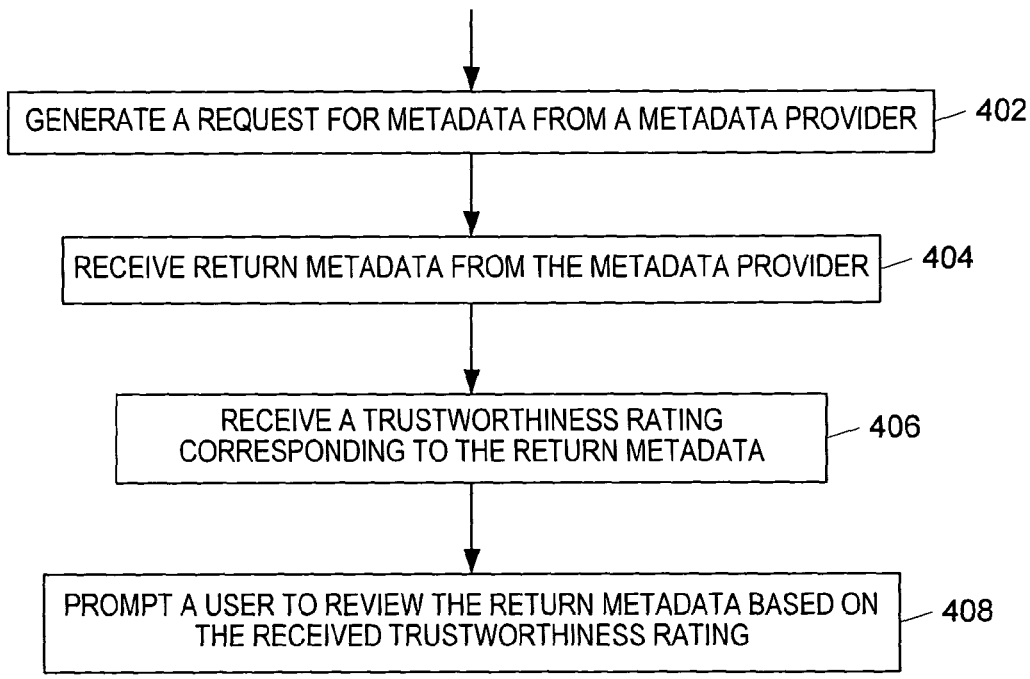
FIG. 4 is an exemplary flow chart illustrates operation of invention software for resolving metadata matched to media content based on a trustworthiness rating associated with the match.

Referring next to FIG. 4, an exemplary flow chart illustrates operation of invention software for resolving metadata matched to media content based on a trustworthiness rating associated with the match. Some users specifically want to be notified of any suggested changes in metadata prior to the changes being applied. After the user approves the changes, the changes are made. The invention software responds to a "quality" metric or other rating (e.g., a trustworthiness rating) on metadata matches. Based on the trustworthiness rating, the invention decides when to ask the user to manually accept a proposed change or perform any other action. Further, the invention software alternatively receives a plurality of trustworthiness ratings and collectively displays the received plurality of trustworthiness ratings to the user. In this manner, the user is bothered only when necessary.

In particular, the invention software generates a request for metadata from the metadata provider at 402 and receives return metadata from the metadata provider in response to the request for metadata at 404. In addition, the invention software receives a trustworthiness rating corresponding to the return metadata at 406. The received trustworthiness rating represents a degree of relevance of the return metadata to the media content. In one form, the received trustworthiness rating includes a percentage (e.g., similar to ranked search results from a search engine) or qualifying language. Based on the received trustworthiness rating, the invention software performs actions automatically, in the background, based on the threshold defined by the user (see FIG. 5). The actions include, but are not limited to, storing the return metadata with the media content (e.g., the rating indicates a high degree of relevance), storing the received trustworthiness rating with the media content, or prompting the user to accept the return metadata (e.g., the rating indicates a low degree of relevance). That is, if the received trustworthiness rating indicates that the return metadata matches the media content, the invention software stores the return metadata with the media content without intervention from the user. If the received trustworthiness rating indicates that the return metadata may not match the media content, the invention software prompts the user to review and accept or reject the return metadata at 408. In general, the invention software operates to perform as many metadata updates as possible without user intervention if authorized by the user to do so.

One or more computer-readable media have computer-executable instructions for performing the method illustrated in FIG. 4.

Figure 5:
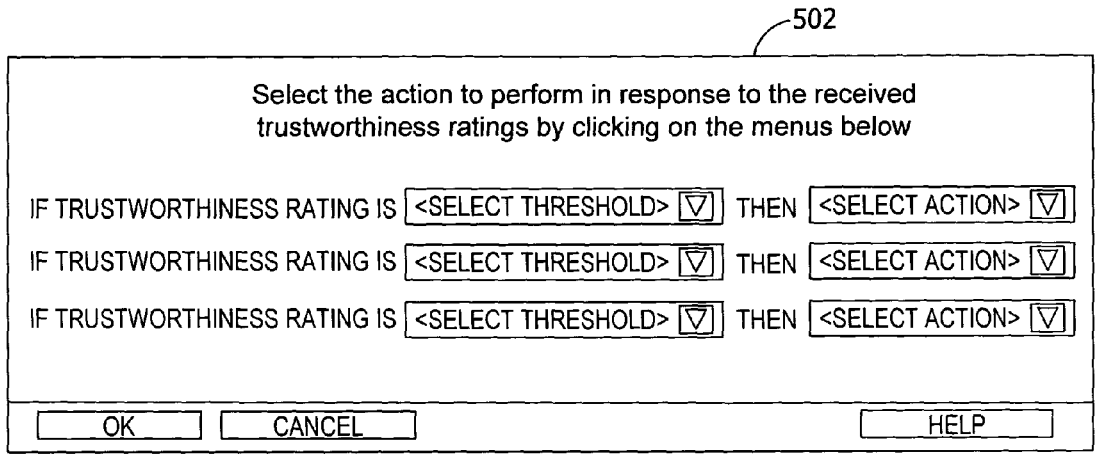
FIG. 5 is an exemplary block diagram illustrating a user interface for specifying rules for automatic disposition of received metadata.

Referring next to FIG. 5, an exemplary block diagram illustrates a user interface 502 for specifying rules for automatic disposition of received metadata. The user sets an option that defines a threshold and the associated behavior for that threshold. The user interface 502 includes a reconciliation field for displaying one or more reconciliation rules for selection by the user. Each of the reconciliation rules specifies an action to perform in response to the trustworthiness rating displayed in the rating field of the user interface 502 of FIG. 3.

In one embodiment, the threshold levels may be associated with the criteria used to identify the metadata. For example, if an identifier was used to match the metadata to the media content, the invention software may silently update the media content file without user intervention as such matching has a high degree of confidence. If a compact disc table of contents (TOC) value was used to match the metadata, the invention software also silently updates the media content file but also tags the metadata as having a lower degree of confidence. If other means were used to match the metadata (e.g., fuzzy means such as enhanced text matching), the invention software either prompts the user for each item of metadata or batches several items for display to the user (e.g., during startup or during regular intervals).

In one example, a TOC value takes the form of a physical identifier for a compact disc identifying the specific digital media file based on the offsets of each track on the disc. The TOC, defined by a well-known specification referred to as the Red Book, identifies an audio CD based absolute times for the start of each track. The TOC, found in the CD's lead-in area, is expected to be the same for all like-entitled CDs published from the same source.

Referring next to FIG. 6, a block diagram illustrates an exemplary computer-readable medium 602 storing a data structure representing a media content file according to the invention. The data structure includes a data field storing media content 604 for rendering by a media player. The data structure also includes a history field such as a history data structure 606 storing a plurality of metadata states 608 for the media content 604 such as metadata state #1 through metadata state #N. Each of the metadata states 608 includes one or more items of metadata associated with the media content 604.

In one embodiment, the history data structure 606 defines an empty metadata state for the media content 604. The invention software enables the user to remove all metadata from the media content 604 by replacing each item of metadata comprises replacing each item of metadata associated with the one state with a null value from the empty metadata state in response to a single command from the user.

For example, the history data structure 606 stores an existing metadata state, an updated metadata state, and/or an empty metadata state in which each of the items of metadata has a null value associated therewith. In one embodiment, state #1 in the exemplary history data structure 606 of FIG. 6 represents a state of the media content 604 lacking any metadata (e.g., as represented by the WMRollbackMetadata tag discussed previously).

Exemplary Operating Environment

Figure 7:
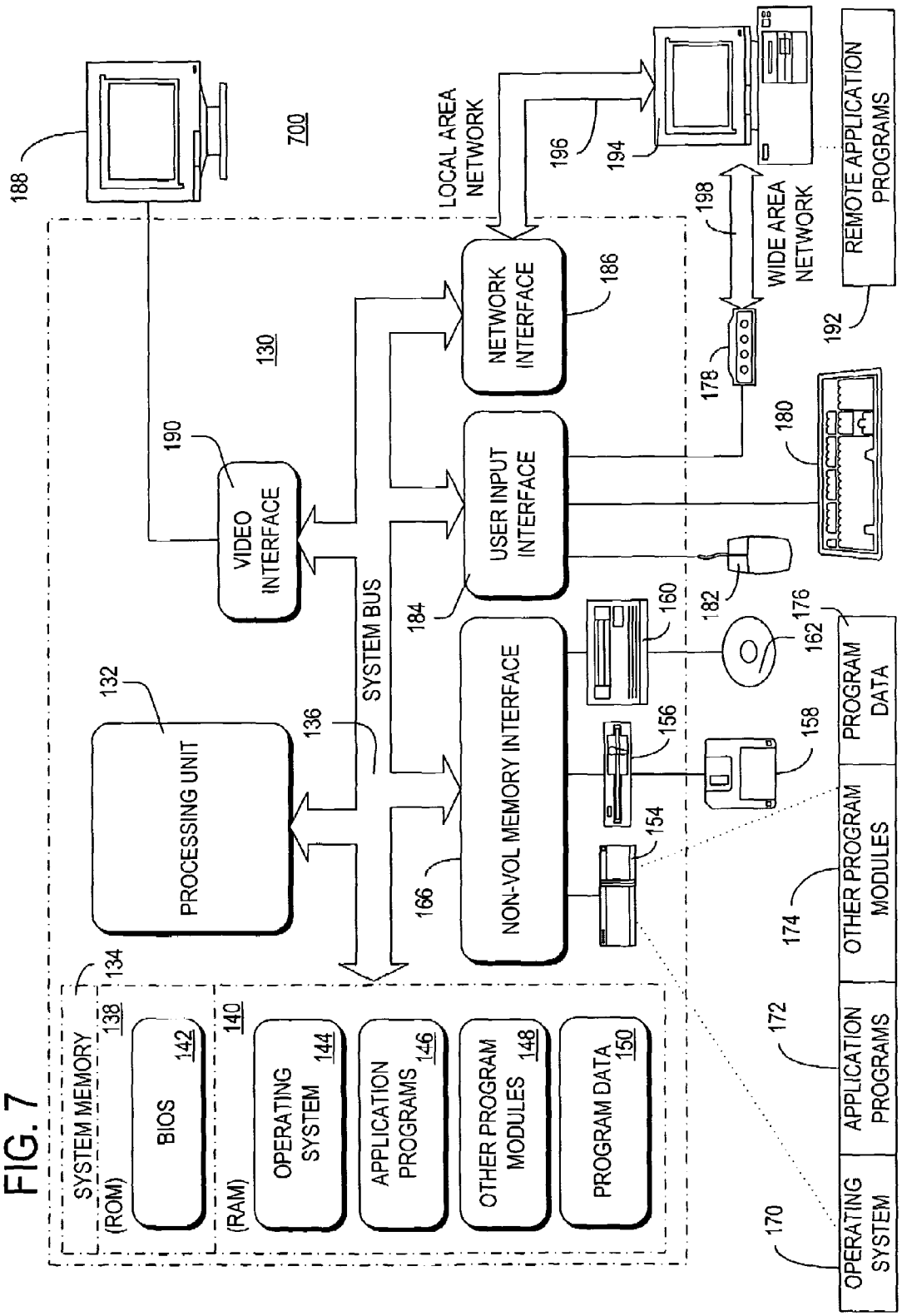
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB).

A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 2 and FIG. 4 to reconcile metadata automatically matched to media content. The computer-executable instructions may be organized into components or modules for execution by computer 130 such as illustrated in FIG. 1.

Those skilled in the art will note that operation of software routines of the invention can be implemented in numerous ways all within the scope of the invention. For example, the methods described herein may be implemented as a set of application programming interfaces (APIs) available to the media player program and to the operating system executing on computer 130. In another embodiment, the software routines described herein may be implemented as an application program executing on computer 130 that interfaces with the operating system and media player program to perform the methods described herein. In yet another embodiment, the software routines described herein may be implemented as part of the operating system executing on computer 102 with an API available to the media player.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for processing data in a media player, said method comprising:

receiving one or more user-configurable reconciliation rules from a user, said reconciliation rules resolving metadata associated with media content;

rendering the media content in the media player;

generating an automatic request for metadata from a metadata provider in response to the media content being rendered in the media player, said requested metadata to be associated with the rendered media content;

receiving return metadata from the metadata provider in response to the automatically generated request for metadata;

receiving a trustworthiness rating corresponding to the return metadata, said receiving trustworthiness rating comprises receiving a plurality of trustworthiness ratings, and collectively displaying the received plurality of trustworthiness ratings to the user; and performing an action specified by the reconciliation rules based on the received trustworthiness rating, said action including at least one of the following based on the received trustworthiness rating: updating a media file associated with the media content, renaming the file, organizing a directory structure of one or more media files, storing the return metadata with the media content, storing the received trustworthiness rating with the media content, and prompting the user to accept the return metadata.

2. The method of claim 1, further comprising replacing an existing metadata state with the received return metadata based on the received trustworthiness rating.

3. The method of claim 1, wherein the return metadata comprises metadata determined by the metadata provider to be associated with the media content.

4. The method of claim 1, wherein the received trustworthiness rating represents a degree of relevance of the return metadata to the media content.

5. The method of claim 1, wherein the received trustworthiness rating comprises a percentage.

6. The method of claim 1, further comprising prompting, based on the received trustworthiness rating, the user to review the return metadata.

7. The method of claim 1, wherein the received trustworthiness rating indicates that the return metadata matches the requested metadata, and further comprising storing the return metadata with the media content without intervention from the user.

8. The method of claim 1, wherein the received trustworthiness rating indicates that the return metadata may not match the requested metadata, and further comprising prompting the user to accept or reject the return metadata.

9. One or more computer-readable storage media having computer-executable instructions for performing the method of claim 1.

10. A method of managing a plurality of metadata states, said plurality of metadata states including one metadata state and another metadata state, each of said metadata states comprising one or more items of metadata automatically matched to media content in response to the media content being rendered by a media player, said method comprising:

maintaining a history data structure in a file storing the media content, said history data structure storing the other metadata state;

receiving items of metadata associated with the other metadata state from a metadata provider, said metadata provider providing the items of metadata associated with the other metadata state that are determined to be relevant to the media content;

receiving a trustworthiness rating corresponding to the received items of metadata, said receiving trustworthiness rating comprises receiving a plurality of trustworthiness ratings, and collectively displaying the received plurality of trustworthiness ratings to a user;

receiving a request from the user to replace the one metadata state with the other metadata state; and replacing each set of metadata items associated with the one metadata state with a corresponding set of metadata items associated with the other metadata state in response to the received request and as a user-configurable function of the received trustworthiness rating.

11. The method of claim 10, wherein each item of metadata comprises a value specific to the media content.

12. The method of claim 10, further comprising displaying the received items of metadata to the user for review.

13. The method of claim 10, further comprising storing the received items of metadata in a file storing the media content.

14. The method of claim 10, wherein the items of metadata associated with the one metadata state are stored in a file along with the media content.

15. The method of claim 10, wherein replacing each set of metadata items comprises replacing each set of metadata items associated with the one metadata state with a corresponding set of metadata items stored in the history data structure.

16. The method of claim 10, wherein the history data structure defines an empty metadata state for the media content and wherein replacing each set of metadata items comprises replacing each set of metadata items associated with the one metadata state with a null value from the empty metadata state.

17. The method of claim 10, wherein replacing each set of metadata items comprises replacing a single item of metadata.

18. The method of claim 10, wherein the other metadata state lacks metadata, and wherein replacing each set of metadata items comprises removing all metadata from the media content.

19. One or more computer-readable storage media having computer-executable instructions for performing the method of claim 10.

20. A system comprising one or more computer-readable media having computer-executable components for managing one or more items of metadata associated with media content being rendered by a media player, said components comprising:

a communications component for receiving metadata automatically matched to the media content in response to the media content being rendered, said communications component further receiving a trustworthiness rating associated with the received metadata, said receiving trustworthiness rating comprises receiving a plurality of trustworthiness ratings, and collectively displaying the received plurality of trustworthiness ratings to a user.

a user-configurable authoring module for selectly applying the received metadata to the media content based on a trustworthiness rating received via the communications component, wherein said authoring module is user-configurable to selectively apply the received metadata to the media content; and a user interface component for displaying to the user for review, accept or reject, based on the received trustworthiness rating, the metadata received via the communications component.

21. The system of claim 20, wherein the authoring module applies the received metadata by replacing each item of metadata associated with one metadata state with a corresponding item of the received metadata associated with another metadata state.

22. The system of claim 20, wherein the communications component further receives a request from the user to store the received metadata with the media content.

23. The system of claim 20, further comprising a rollback module for maintaining a history data structure in the file, said history data structure storing the received metadata along with a previous metadata state associated with the media content.

24. The system of claim 23, wherein the authoring module replaces each item of metadata associated with one metadata state with a corresponding item of metadata from another metadata state maintained in the history data structure by the rollback module.

25. The system of claim 23, wherein the history data structure defines an empty metadata state for the media content and wherein the authoring module replaces each item of metadata associated with the one metadata state with a null value from the empty metadata state.

26. A method of updating metadata in a computer system having a user interface including a display and being responsive to a user interface selection device, said method comprising:

rendering media content by a media player, receiving metadata automatically matched to the rendered media content from a metadata provider in response to the media content being rendered in the media player, displaying the received metadata to a user on the display;

receiving, from the metadata provider, a trustworthiness rating associated with the received metadata, said receiving trustworthiness rating comprises receiving a plurality of trustworthiness ratings, and collectively displaying the received plurality of trustworthiness ratings to the user;

displaying the received trustworthiness rating to the user on the display, receiving a selection request from the user via the user interface selection device, said selection request specifying acceptance or rejection of the displayed metadata by the user based on the received trustworthiness rating associated with the displayed metadata; and performing an action on the displayed metadata in response to the received selection request.

27. The method of claim 26, wherein the selection request specifies rejection of the received metadata, and wherein the selection request further comprises a request from the user to edit the received metadata.

28. The method of claim 26, wherein the selection request specifies rejection of the received metadata, and wherein the selection request further comprises a request from the user to restore previously received metadata.

29. The method of claim 26, wherein the selection request specifies rejection of the received metadata, and wherein the selection request further comprises a request from the user to discard the received metadata.

30. The method of claim 26, wherein the selection request specifies rejection of the received metadata, and wherein the selection request further comprises a request from the user to search for additional metadata for the media content.

31. The method of claim 26, wherein the selection request specifies acceptance of the received metadata, and wherein the selection request further comprises a request from the user to apply the received metadata by storing the received metadata with the media content.

32. The method of claim 26, further comprising storing the received metadata in a cache.

33. The method of claim 26, further comprising displaying one or more reconciliation rules on the display for selection by the user via the user interface selection device, each of said reconciliation rules specifying an action to perform in response to the received trustworthiness rating.

34. One or more computer-readable storage media having computer-executable instructions for performing the method of claim 26.

35. A user interface enabling a user to select one of a plurality of values associated with a metadata item, said metadata item being automatically matched to media content in response to the media content being rendered by a media player, said user interface comprising:

one or more data fields, each of said data fields displaying a metadata value associated with the metadata item;

a rating field displaying a trustworthiness rating associated with the metadata value for the data fields, said displaying trustworthiness rating comprises receiving a plurality trustworthiness ratings, and collectively displaying the received plurality of trustworthiness ratings to the user;

a selection field for receiving a command from the user, said command selecting, based on the corresponding trustworthiness rating displayed in the rating field, one or more of the metadata values from the data fields for association with the metadata item and storage with the media content; and a query field for receiving a search term from the user, said search term describing the media content and enabling determination of another metadata value relevant to the media item based on the received search term.

36. The user interface of claim 35, wherein at least one of the metadata values in the plurality of data fields is selected automatically based on a trustworthiness rating associated with the at least one metadata value.

37. The user interface of claim 35, wherein the selection field comprises a plurality of checkboxes, each of said checkboxes being associated with one of the plurality of data fields.

38. The user interface of claim 35, wherein the selection field comprises a button that indicates acceptance of the selected metadata value.

39. The user interface of claim 35, wherein the metadata item comprises at least one of the following: an album title, an artist name, a song title, a genre, a composer name, a track number, a studio, a director, and a rating.

40. The user interface of claim 35, further comprising a reconciliation field for displaying one or more user-configurable reconciliation rules for selection by the user, each of said reconciliation rules specifying an action to perform in response to the trustworthiness rating displayed in the rating field.

41. The user interface of claim 35, wherein the user interface comprises a display device.

\* \* \* \* \*